United States Patent
Sugawara et al.

[19]

[11] Patent Number: 5,829,219
[45] Date of Patent: Nov. 3, 1998

[54] FRAME FORMING MEMBER

[75] Inventors: Kohki Sugawara; Suguru Yoshida; Masakazu Sato, all of Wako, Japan

[73] Assignee: Honda Giken Kogyo Kabushiki Kaisha, Tokyo, Japan

[21] Appl. No.: 268,615

[22] Filed: Jul. 1, 1994

[30] Foreign Application Priority Data

Jul. 2, 1993 [JP] Japan .................................. 5-164794

[51] Int. Cl.$^6$ ........................... B62D 25/04; B62D 25/20
[52] U.S. Cl. ....................... 52/653.2; 52/655.1; 52/731.6; 52/735.1; 52/736.2; 29/897.2; 29/890.148; 296/29; 296/205; 296/209
[58] Field of Search ............................... 52/653.2, 655.1, 52/738, 721, 731.2, 731.6, 735.1, 736.1, 736.2, 736.3, 737.2; 296/205, 203, 209, 29; 29/897.2, 890.148; 72/58, 61, 370

[56] References Cited

U.S. PATENT DOCUMENTS

| | | | |
|---|---|---|---|
| 2,238,037 | 4/1941 | Cornell, Jr. ..................... | 29/890.148 X |
| 2,265,443 | 12/1941 | McGuire ............................... | 52/721 X |
| 2,290,965 | 7/1942 | Hodapp et al. ...................... | 72/370 X |
| 2,389,907 | 11/1945 | Helmuth ................................. | 296/203 |
| 2,735,389 | 2/1956 | Wurzburger ................... | 29/890.148 X |
| 3,383,901 | 5/1968 | Stalter ...................................... | 72/370 |
| 3,535,909 | 10/1970 | Latham ........................... | 29/890.148 X |
| 3,583,188 | 6/1971 | Nakamura ................................... | 72/58 |
| 4,052,833 | 10/1977 | Beine .................................... | 52/721 X |
| 4,541,648 | 9/1985 | Takamiya et al. ..................... | 280/281.1 |
| 4,660,345 | 4/1987 | Browning .............................. | 52/653.2 |
| 4,826,238 | 5/1989 | Misono et al. ...................... | 296/205 X |
| 4,863,771 | 9/1989 | Freeman .............................. | 296/205 X |
| 4,911,495 | 3/1990 | Haga et al. .............................. | 296/209 |
| 5,269,585 | 12/1993 | Klages et al. ........................... | 296/205 |
| 5,332,277 | 7/1994 | Enning et al. ............................. | 296/29 |
| 5,332,281 | 7/1994 | Janotik et al. ........................... | 296/209 |
| 5,352,011 | 10/1994 | Kihara et al. ...................... | 296/209 X |
| 5,362,120 | 11/1994 | Cornille, Jr. ....................... | 296/209 X |
| 5,372,400 | 12/1994 | Enning et al. ...................... | 296/209 X |

FOREIGN PATENT DOCUMENTS

| | | | |
|---|---|---|---|
| 146 716 A2 | 7/1985 | European Pat. Off. . | |
| 25 54 609 A1 | 6/1977 | Germany . | |
| 3428864 | 2/1986 | Germany . | |
| 258868 | 11/1987 | Japan ..................................... | 296/203 |
| 63-108915 | 5/1988 | Japan .............................. | 29/890.148 |
| 18784 | 1/1989 | Japan ..................................... | 296/209 |
| 299989 | 12/1990 | Japan ..................................... | 296/209 |
| 56687 | 2/1992 | Japan ..................................... | 296/209 |
| 221276 | 8/1992 | Japan ..................................... | 296/209 |
| 4-221277 | 8/1992 | Japan ..................................... | 296/203 |
| 841697 | 6/1981 | U.S.S.R. .................................... | 72/61 |
| 20117 | 9/1898 | United Kingdom .............. | 29/890.148 |
| 902721 | 8/1962 | United Kingdom .................. | 52/731.4 |
| WO 90/02680 | 3/1990 | WIPO . | |

OTHER PUBLICATIONS

"Anwendungsaspekte Beim Innenhochdruck—Umformen", F. Klaas, Werkstattstechnik Springer–Verlag 1989, pp. 210–214.

European Search Report, Sep. 19, 1994.

*Primary Examiner*—Carl D. Friedman
*Assistant Examiner*—Laura A. Callo
*Attorney, Agent, or Firm*—Armstrong, Westerman, Hattori, McLeland & Naughton

[57] ABSTRACT

A frame forming member includes a member body formed from an extrudate having a closed sectional structure portion, and a junction for another member, which is integral with the member body and formed by expanding a portion of a peripheral wall of the closed sectional structure portion.

6 Claims, 7 Drawing Sheets

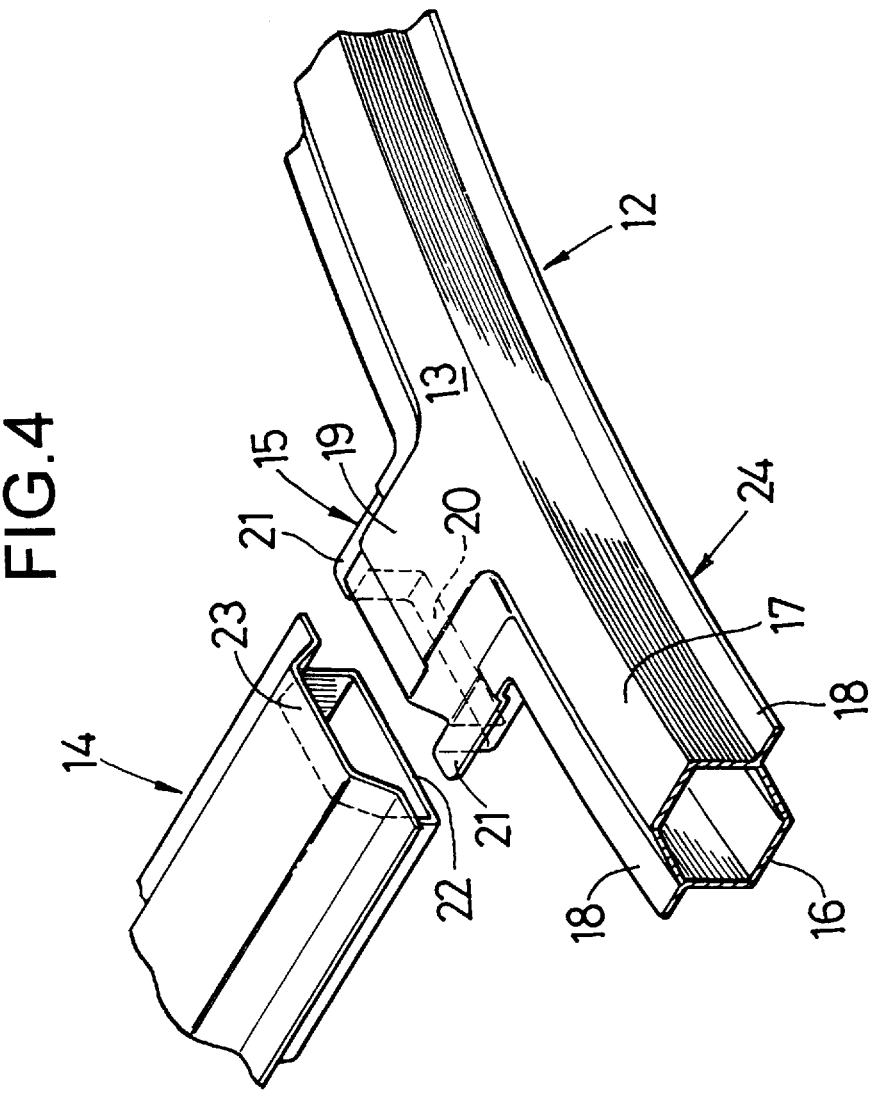

FRAME FORMING MEMBER

BACKGROUND OF THE INVENTION

1. Field of the Invention

The present invention relates to a frame forming member for use in a frame structure, for example, for a vehicle body.

2. Description of the Prior Art

Conventionally, in a frame structure for a vehicle body, a joint member having three junctions is used, for example, when an upper front pillar, as a frame forming member, is joined with a front roof rail, as well as a side roof rail. The junctions and the front pillar, or the like, are welded after fitting.

However, when the joint member is used, the following disadvantages are encountered: the number of parts is increased, resulting in an increased manufacture cost for a frame structure. In addition, the number of joining points is large, resulting in a reduction in rigidity of the frame structure, a reduction in dimensional accuracy due to a thermal strain by a welding, and an assembly inaccuracy are introduced.

SUMMARY OF THE INVENTION

It is an object of the present invention to provide a frame forming member of the type described above, wherein a member body and a junction for another member are integrally formed, thereby enabling the above problems to be overcome.

To achieve the above object, according to the present invention, there is provided a frame forming member, comprising a member body formed from an extrudate having a seamless or closed hollow sectional structure portion, and a junction for another member, which is integral with the member body and formed by expanding a portion of a peripheral wall of the closed sectional structure portion.

With the above construction, since the member body of the frame forming member is formed from the extrudate having the seamless or closed hollow sectional structure portion, the frame forming member has a high rigidity. In addition, since the frame forming member includes the junction integral with the member body, reduction in numbers of parts and joining points is achieved. Thus, it is possible to provide a reduction in manufacture cost for the frame structure and increases in rigidity and dimensional accuracy.

The above and other objects, features and advantages of the invention will become apparent from the following description of a preferred embodiment taken in conjunction with the accompanying drawings.

BRIEF DESCRIPTION OF THE DRAWINGS

FIG. 4 is a perspective view of an essential portion, illustrating a joined relationship between an upper front pillar and a front roof rail;

DESCRIPTION OF THE PREFERRED EMBODIMENT

Figure 1:
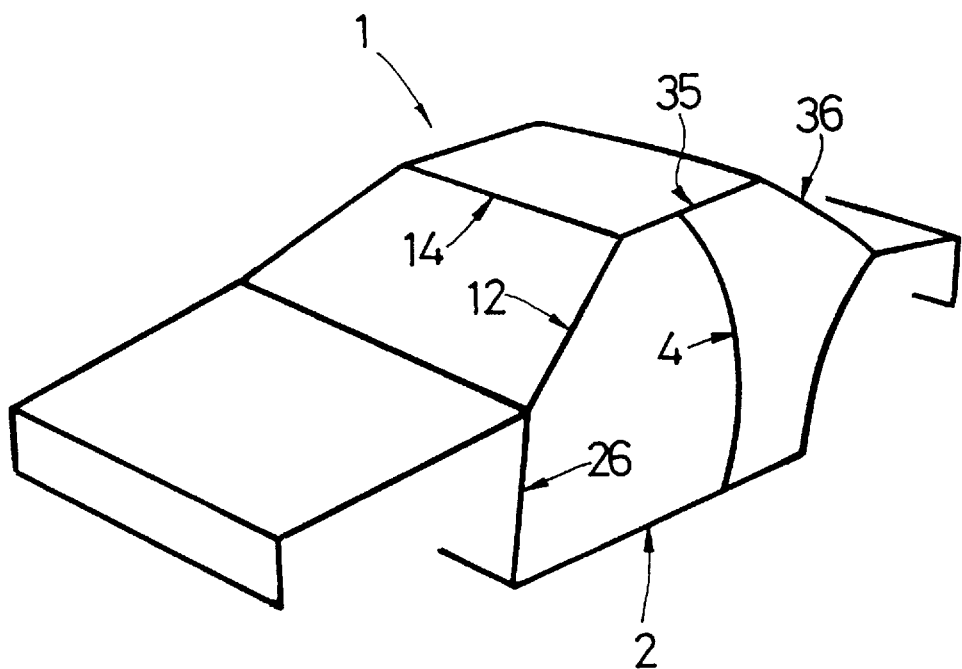
FIG. 1 is a diagrammatic perspective illustration of a frame structure of a vehicle body.

FIG. 1 illustrates an aluminum alloy frame structure 1 for a vehicle body. A frame forming member is used for producing this frame structure 1.

Figure 2:
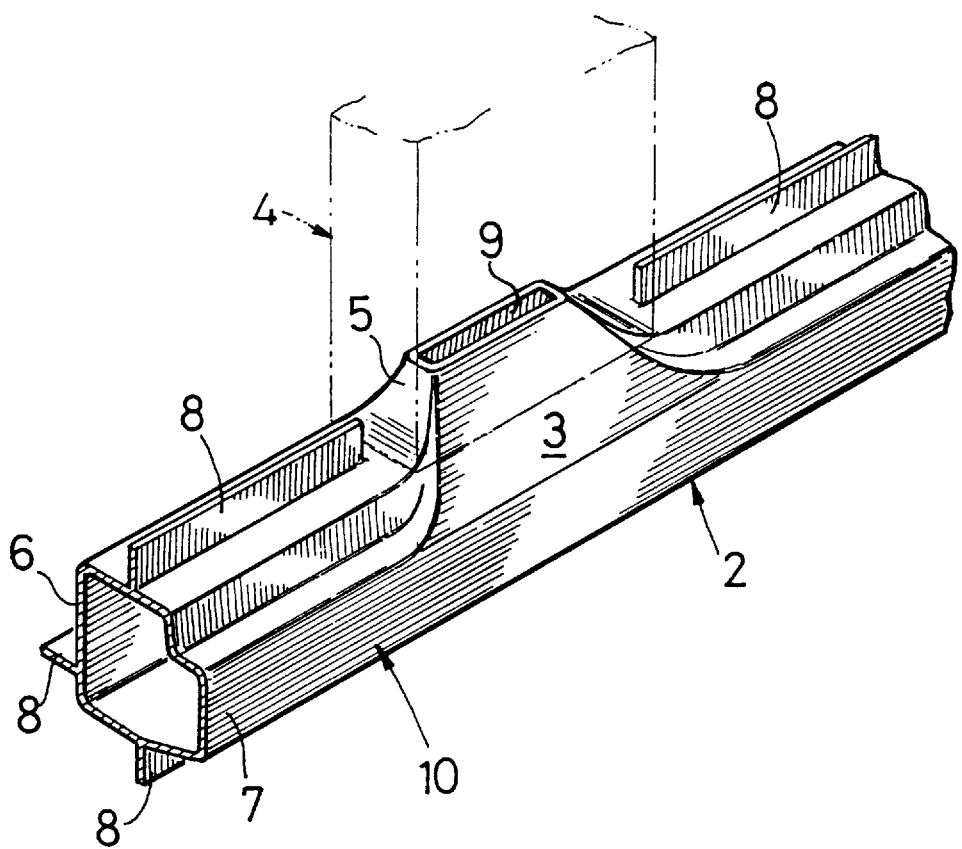
FIG. 2 is a perspective view of an essential portion of a side sill.

Referring to FIGS. 1 and 2, a side sill 2 as the frame forming member includes a side sill body (member body) 3, and a junction 5 integral with the side sill body 3 and used for joining the side sill 2 with a center pillar (another member) 4.

The side sill body 3 is formed from a seamless extrudate including a closed hollow sectional structure portion 6 and a plurality of Bin projections 8 projectingly provided on an outer surface of a peripheral wall 7 of the closed sectional structure portion 6 to extend longitudinally. In this case, one of the Bin projections 8 is divided into two portions at the junction 5, such that the junction 5 is sandwiched between such divided two projection portions.

The junction 5 is formed by expanding or swelling a portion of the peripheral wall 7 of the closed hollow sectional structure portion 6, and has a rectangular opening 9 at a tip end face thereof. The opening 9 is utilized to join the side sill 2 with the center pillar 4.

In this way, the side sill 2 has a high rigidity, because it is formed from the extrudate with the side sill body 3 having the closed sectional structure portion 6. In addition, since the side sill 2 has the junction 5 integral with the side sill body 3, it is possible to reduce the number of parts and joining points.

Figure 3A:
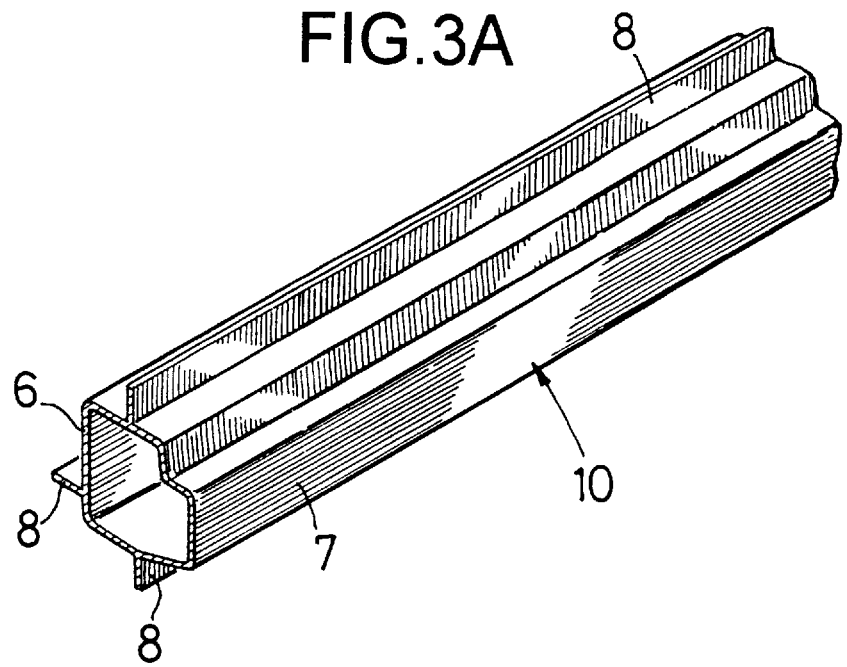
FIG. 3A is a perspective view of an essential portion of a seamless extrudate for the side sill.
Figure 3B:
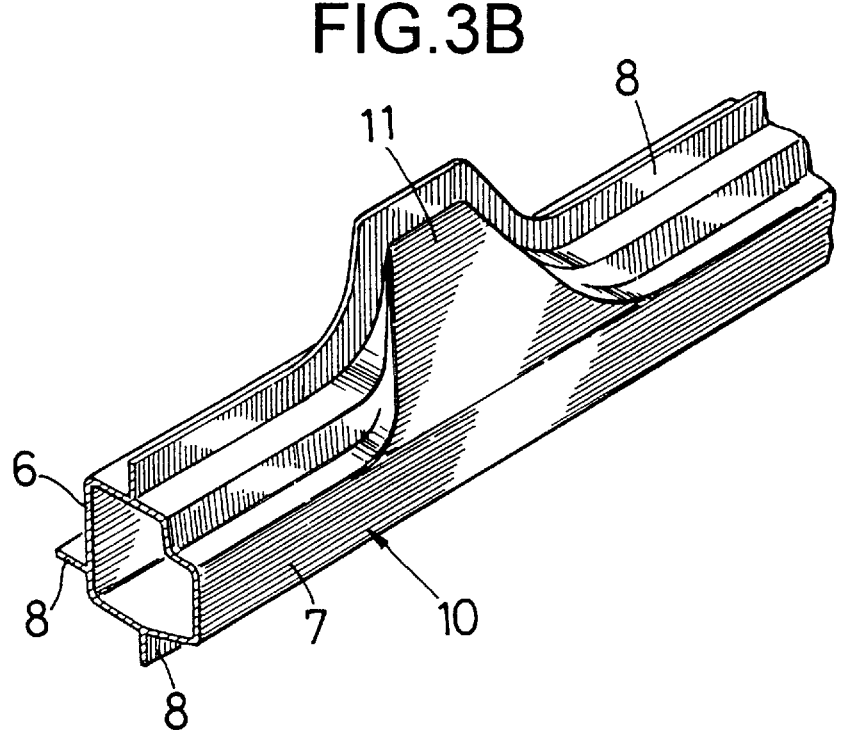
FIG. 3B is a perspective view of an essential portion of an intermediate product for the side sill.

In fabricating the side sill 2, as shown in FIG. 3A, a seamless, hollow extrudate 10 is first produced which includes the closed sectional structure portion 6 and a plurality of Bin-like projections 8 projectingly provided on the outer surface of the peripheral wall 7 of the closed sectional structure portion 6 to extend longitudinally. Then, as shown in FIG. 3B, an area of the peripheral wall 7 of the closed sectional structure portion 6 corresponding to the junction is expanded along with one projection 8 by bulging forming to form a hollow bladder-like bulge 11 having a projection, thereby providing an intermediate product. Thereafter, the bladder-like bulge 11 is subjected to a cutting to define the opening 9, and a portion of each of the projections 8 located on opposite sides of the opening 9 is cut off to form the junction 5.

Referring to FIGS. 1 and 4, an upper front center pillar 12 as a frame forming member includes an upper front center pillar body (member body) 13 having an arcuate shape, and a junction 15 integral with, and angularly offset from, the upper front center pillar body 13 and used for joining the center pillar 12 with a front roof rail (another member) 14. The upper front center pillar body 13 is formed from an extrudate including a seamless or closed hollow sectional structure portion 16, and a plurality of projections 18 projectingly provided on an outer surface of a peripheral wall 17 of the closed sectional structure portion 16 to extend longitudinally. In this case, one of the projections 18 is continuously formed with a portion of the junction 15.

The junction 15 is formed by expanding or swelling a portion of the peripheral wall 17 of the closed sectional structure portion 16 and a portion of the projection 18. The junction 15 includes a stepped hollow box-like portion 19 continuously formed on to the closed sectional structure portion 16 and the one projection 18, a channel-like portion 20 continuously formed to the stepped box-like portion 19, and a pair of bulges 21 continuously formed to end edges of sidewalls of the channel-like portion 20 and the projection 18.

The front roof rail 14 is formed from an extrudate. The rail 14 is joined to the junction 15, by fitting a channel-like sectional portion 22 of the rail 14 over the channel-like portion 20 and by superposing a folded protrusion 23 continuously formed to the channel-like sectional portion 22 over the stepped box-like portion 19 and opposite protrusions 21 of the junction 15.

Figure 5A:
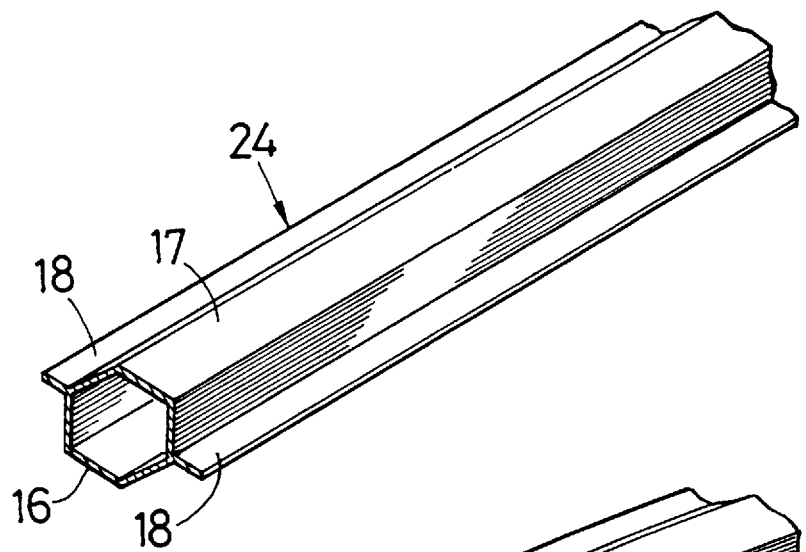
FIG. 5A is a perspective view of an essential portion of a semless, hollow extrudate for the upper front pillar.
Figure 5B:
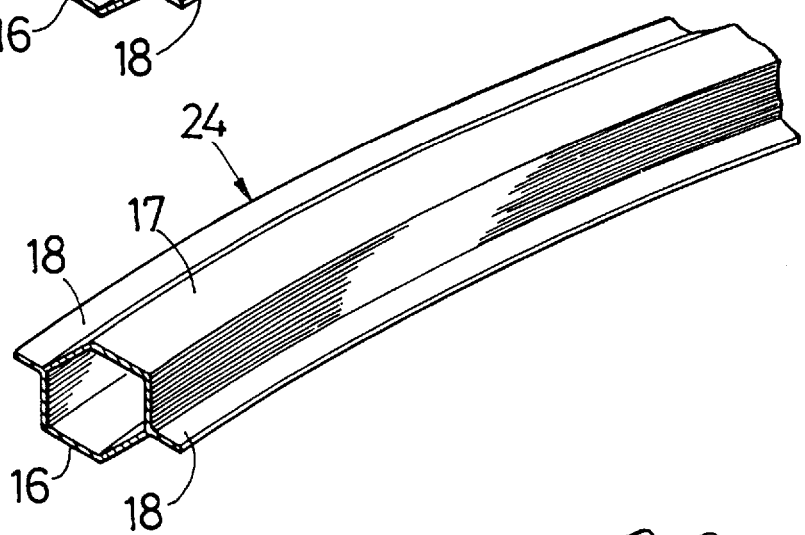
FIG. 5B is a perspective view of an essential portion of a primary intermediate product for the upper front pillar.
Figure 5C:
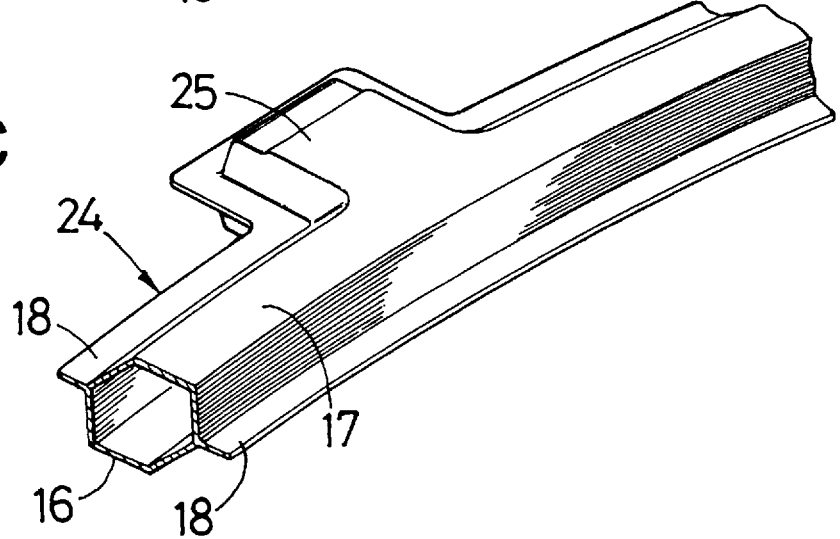
FIG. 5C is a perspective view of an essential portion of a secondary intermediate product for the upper front pillar.

In fabricating the upper front center pillar 12, as shown in FIG. 5A, a seamless extrudate 24 is first produced which includes the closed hollow sectional structure portion 16, and a plurality of Bin projections 18 projectingly provided on the outer surface of the peripheral wall 17 of the closed sectional structure portion 16 to extend longitudinally. Then, as shown in FIG. 5B, the extrudate 24 is formed into an arcuate shape by bending, thereby providing a primary intermediate product. Further, as shown in FIG. 5C, an area of the peripheral wall 17 of the closed sectional structure portion 16 corresponding to the junction is expanded by bulging forming along with the one projection 18 to form a hollow bladder-like bulge 25 having a projection, thereby providing a secondary intermediate product. Thereafter, the bladder-like bulge 25 having a projection is subjected to a pressing process including a bending, and the like; to form the junction 15.

Figure 6:
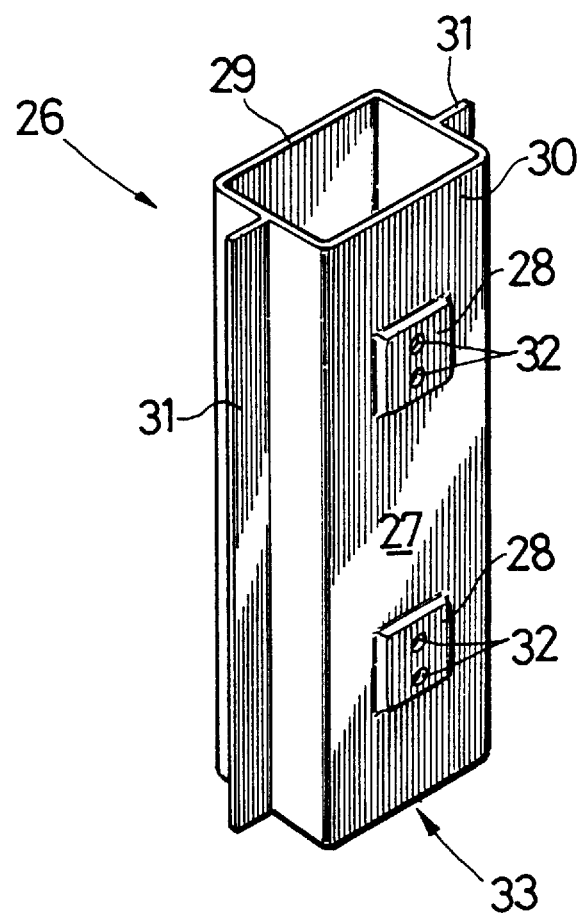
FIG. 6 is a perspective view of a lower front pillar.

Referring to FIGS. 1 and 6, a lower front center pillar 26 as a frame forming member includes a lower front center pillar body (member body) 27, and junctions 28 integral with the lower front center pillar body 27. The lower front center pillar body 27 is formed from an extrudate including a seamless closed sectional structure portion 29, and a plurality of projections 31 projectingly provided on an outer surface of a peripheral wall 30 of the closed sectional structure portion 29 to extend longitudinally.

The junction 28 is formed by expanding or swelling a flat portion of the peripheral wall 30 of the closed sectional structure portion 29. The junction 28 is of a truncated tetragonal pyramidal shape having a reduced lower height, and has a plurality of bolt bores 32 on an upper base wall thereof. Each of the junction 28 functions as a mounting portion for a hinge (another member) on a front door.

Figure 7A:
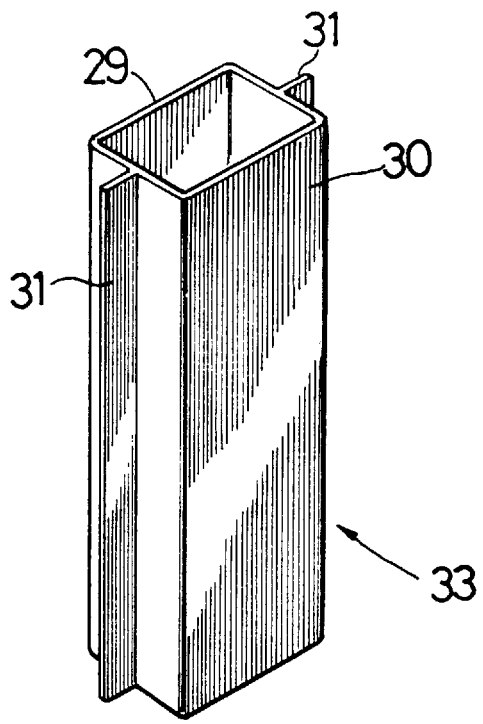
FIG. 7A is a perspective view of an extrudate for the lower front pillar.
Figure 7B:
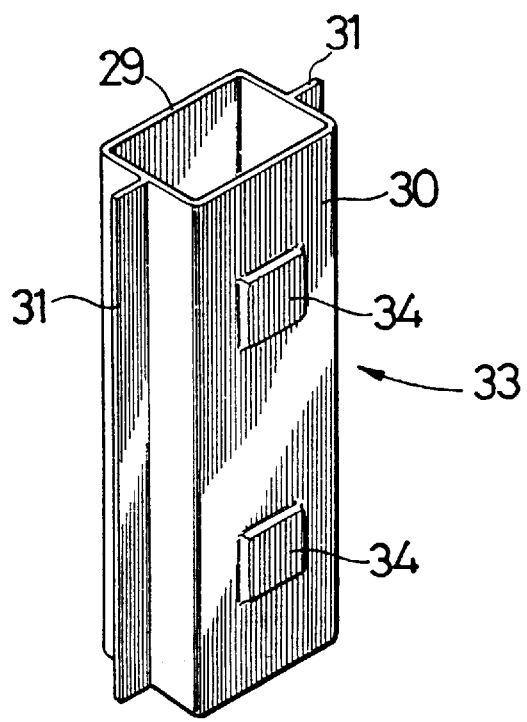
FIG. 7B is a perspective view of an intermediate product for the lower front pillar.

In fabricating the lower front center pillar 26, as shown in FIG. 7A, an extrudate 33 is first produced which includes the seamless or closed hollow sectional structure portion 29, and a plurality of projections 31 projectingly provided on the outer surface of the peripheral wall 30 of the closed sectional structure portion 29 to extend longitudinally. Then, as shown in FIG. 7B, areas of the peripheral wall 30 of the closed sectional structure portion 29 corresponding to the are expanded by bulging forming to form a plurality of the truncated tetragonal pyramidal bulges 34 having a reduced height, thereby providing an intermediate product. Thereafter, the upper base wall of each of the bulges 34 is subjected to a drilling to define a plurality of bolt-insertion bores 32, thereby providing the junction 28.

The above-described frame-forming members are only illustrative, and the present invention is applicable to other frame-forming members, e.g., a side frame rail 35, a rear pillar 36, and the like. In addition, the application of the present invention is not limited to the frame structure for a vehicle body. Further, a technique for bulging a portion of a peripheral wall of an extrudate having a seamless or closed hollow sectional structure portion can be utilized for the formation of a conspicuous portion of a member, thereby omitting a cosmetic plate which has been conventionally mounted to a frame-forming member to cover it.

What is claimed is:

1. The frame forming member comprising a longitudinally extending member body having a closed sectional structure portion and a junction for another member, which is integral with said member body and formed by expanding a portion of a peripheral wall of said closed sectional structure portion, said member body being formed from an extrudate having a non-circular cross-section and having longitudinally extending flanges, wherein said portion of said peripheral wall of said closed sectional structural portion which has been expanded includes one of said longitudinally extending flanges and wherein a region of said flange is removed from said portion of said peripheral wall which has been expanded.

2. The frame forming member as claimed in claim 1, wherein a bulging process is performed to expand said portion of said peripheral wall.

3. The frame forming member as claimed in claim 1, wherein said extrudate is formed from an aluminum alloy.

4. The frame forming member as claimed in claim 1, wherein said portion of said peripheral wall which has been expanded is cut to define an opening.

5. The frame forming member as claimed in claim 4, wherein said extrudate is formed from an aluminum alloy.

6. A frame forming member (26) as claimed in claim 1, wherein the peripheral wall portion (30) that is expanded is substantially flat.

* * * * *